(12) United States Patent
Bjorklund et al.

(10) Patent No.: US 9,039,884 B2
(45) Date of Patent: May 26, 2015

(54) ELECTROSTATIC COALESCING DEVICE (75) Inventors: Erik Bjorklund, Oslo (NO); Reidar Friberg, Oslo (NO)

(73) Assignee: HAMWORTHY PLC, Poole, Dorset (GB)

( * ) Notice: Subject to any disclaimer, the term of this patent is extended or adjusted under 35 U.S.C. 154(b) by 1037 days.

(21) Appl. No.: 13/070,536

(22) Filed: Mar. 24, 2011

(65) Prior Publication Data

US 2011/0266152 A1    Nov. 3, 2011

(30) Foreign Application Priority Data

Apr. 28, 2010    (NO) .................................. 20100613

(51) Int. Cl.
*B03C 11/00*    (2006.01)
*B01D 17/06*    (2006.01)

(52) U.S. Cl.
CPC ............... *B03C 11/00* (2013.01); *B01D 17/06* (2013.01); *B03C 2201/02* (2013.01)

(58) Field of Classification Search
CPC ............................... B03C 11/00; B01D 17/06
USPC ........................................................ 204/672
See application file for complete search history.

(56) References Cited

U.S. PATENT DOCUMENTS

| | | | | |
|---|---|---|---|---|
| 4,702,815 A | * | 10/1987 | Prestridge et al. | ............ 204/673 |
| 4,804,453 A | * | 2/1989 | Sublette et al. | ............... 204/673 |
| 2005/0036924 A1 | * | 2/2005 | Nilsen et al. | ............. 422/186.04 |
| 2005/0040045 A1 | * | 2/2005 | Nilsen et al. | .................. 204/672 |
| 2008/0156649 A1 | * | 7/2008 | Sams | ............................. 204/554 |
| 2009/0255816 A1 | | 10/2009 | Tryti et al. | |

FOREIGN PATENT DOCUMENTS

| | | |
|---|---|---|
| WO | 03/039706 A1 | 5/2003 |
| WO | 03039706 A1 | 5/2003 |
| WO | 03/049834 A1 | 6/2003 |
| WO | 03049834 A1 | 6/2003 |
| WO | 2007135503 A1 | 11/2007 |
| WO | 2007135506 A1 | 11/2007 |
| WO | 2007/138434 A1 | 12/2007 |

OTHER PUBLICATIONS

Search Report for Norwegian Application No. 20100613, Nov. 8, 2010 (2 p.).
European Search Report for European Application No. 11155616, Jul. 7, 2011 (6 p.).

\* cited by examiner

*Primary Examiner* — Bryan D. Ripa
(74) *Attorney, Agent, or Firm* — Conley Rose, P.C.

(57) ABSTRACT

The invention concerns an electrostatic coalescing device that includes a vessel or a pipe through which a mixture of fluids flows. At least one metal electrode plate and transformer are arranged inside the pipe/vessel. The electrode plate and transformer are fully enclosed by insulation, and the transformer is energized from an external alternating low voltage source/power supply located outside the vessel/pipe. The transformer includes a first end of a high voltage winding connected electrically to the metal plate within the insulation.

19 Claims, 6 Drawing Sheets

ELECTROSTATIC COALESCING DEVICE

CROSS-REFERENCE TO RELATED APPLICATIONS

This application claims the benefit under 35 U.S.C. §119 (a) of Norwegian Patent Application 20100613 filed Apr. 28, 2010 and entitled "Electrostatic Coalescing Device," hereby incorporated herein by reference for all purposes.

STATEMENT REGARDING FEDERALLY-SPONSORED RESEARCH OR DEVELOPMENT

Not applicable.

INTRODUCTION

The present invention relates to an electrostatic coalescing device.

BACKGROUND

The invention is particularly applicable to electrostatic coalescing devices for promoting the coalescence of water in an emulsion comprising oil and water. However, the invention is applicable to any type of coalescing application where it possible to promote the coalescence of an emulsion component in an emulsion comprising a mixture of at least two different fluid components by means of an electric field applied to the emulsion.

In the oil and gas industry where oil is extracted from one or more wells in an oil field, oil will be extracted together with water. The water has to be removed from the oil and this is mainly done by means of settling tanks in which the oil is permitted to settle under the action of gravity. However, stable oil-water emulsions may develop during the production of the oil. For example, the use of gas-liquid cyclones might contribute to a stable emulsion that will be difficult to separate only by means of settling. After having passed through, for example, a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different permittivity.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity than said continuous phase. The dispersed phase may for instance be an electrical conductor, such as water. In an electrostatic coalescing device, an emulsion is subjected to an alternating current field or to a continuous or pulsed direct current field.

WO 03/049834 A1 discloses an electrostatic coalescing device comprising several planar sheet-shaped electrodes extending in parallel with each other so as to form flow passages for an emulsion between each pair of adjacent electrodes. Different electric potentials are applied to the electrodes so as to form an electric field between each pair of adjacent electrodes, which e.g. will promote the coalescence of water contained in a water-in-oil emulsion flowing through the flow passages between the electrodes. This system requires an external high voltage transformer and a high voltage connection between the transformer and the electrodes.

WO 2003/039706 discloses an electrostatic coalescing device comprising a number of tubular electrostatic coalescer elements. The tubular elements are extending in the flow direction and are arranged in a matrix substantially covering the entire cross sectional area of said vessel. An electrical field is applied to the fluids flowing through said coalescer elements. The electrodes may be insulated and energized trough a capacitive coupling from a central module. A complete transformer may be moulded into a central module. The high voltage secondary winding of the transformer may be insulated from the fluid, whereas the primary terminal winding is accessible from the outside.

WO 2007/135503 and WO 2007/135506 describes an electrostatic coalescing device comprising pairs of sheet-shaped electrodes arranged at a distance from each other side-by-side so as to form a flow passage between them. Each of the electrodes comprising a sheet-shaped conductive member of electrically conductive material, the mutual distance between the conductive members of the two electrodes of a pair varies along the electrodes as seen in a direction perpendicular to the intended flow direction of fluid passing through the flow passage between the electrodes. A power supply supplies mutually different electric potentials to the conductive members of the electrodes of said pair so as to form an electric field between the electrodes. An electrode pair is connected to an external transformer. High voltage connections are complicated, highly sensitive to fouling, bulky, and not flexible.

SUMMARY OF THE INVENTION

The object of the present invention is to provide an electrostatic coalescing device of new and advantageous design.

According to the invention, this object is achieved by an electrostatic coalescing device having the following features.

The inventive coalescing device comprises: a vessel or a pipe through which a mixture of fluids flows, at least one metal electrode plate and transformer arranged inside said pipe/vessel, wherein said electrode plate and transformer are fully enclosed by insulation, and wherein said transformer is energized from an external alternating low voltage source/power supply located outside the vessel/pipe, said transformer having a first end of a high voltage winding connected electrically to the metal plate within the insulation.

A second end of the high voltage winding may be carried out of the insulation and electrically connected to a ground potential of the vessel/pipe. The external power supply/voltage source may be electrically connected to a low voltage winding of the transformer. The electrical connection from the external power supply/voltage source to the low voltage winding of the transformer may be carried through the vessel or pipe in a steel tubing, wherein said steel tubing is mechanically connected to the insulation and is carried into/through the insulation. In an embodiment both ends of the low voltage winding may be carried through the insulation and out of said vessel/pipe in the protecting steel tubing and connected to the external power supply. In a further embodiment a second end of the low voltage winding of the transformer may, within the insulation, be connected to the second end of the high voltage winding connected to the ground potential, and a first end of the low voltage winding is carried out of the insulation in the protecting steel tubing and electrically connected to a first terminal of the external power supply, wherein a second terminal of the external power supply is connected to the ground potential.

The electrostatic coalescing device may further comprise a number of adjacent insulated metal electrode plates, each of said insulated plates having a dedicated integrated transformer, wherein a grounded conductive plate is arranged between any adjacent pair of insulated plates. Alternatively, the electrostatic coalescing device may further comprise a number of adjacent insulated metal electrode plates, each of said insulated plates having a dedicated integrated transformer and a dedicated external power supply, wherein the ends of the low voltage winding of every other plate are electrically twisted providing adjacent plates to be energized with an opposite polarity. The electrostatic coalescing device may alternatively comprise a number of adjacent insulated metal electrode plates, each of said insulated plates having a dedicated integrated transformer and a dedicated external power supply, wherein the first end of the low voltage winding of every other plate is electrically twisted providing adjacent plates to be energized with an opposite polarity. The electrostatic coalescing device may as a further alternative embodiment comprise a number of insulated plates, each plate having a dedicated integrated transformer, wherein every other external power supply has the opposite terminal connected to a ground potential. The external power supplies/voltage sources may be connected to a common timer for synchronization, providing said insulated plates with an alternating voltage with a same frequency and a common time reference.

The present invention relates to an element which can comprise a coalescing device located inside a pipe, a vessel, a tank, etc. The invention provides a fully electrically insulated high voltage coalescing sheet. The purpose of the high voltage coalescing sheet is to establish a high voltage electric field inside the volume of the pipe, vessel, or tank. The number of coalescing sheets is defined by the wanted field magnitude in the fluid in said vessel, pipe, or tank and the diameter of its cross-section. The use of sheets, as compared with pipes/channels as in WO 2003/039706, also enables constructions of long elements. Pipes/channels are prone to plugging and deposition of sand and other material in the fluid to be coalesced, and cannot be made very long. The use of sheet also enables construction of an oil polishing tool, since a high field may be created over a larger area, providing longer retention times in the electric field. The present invention also provides a configuration with no obstructions in the vertical direction, and sediments will therefore fall to the bottom of the tank and will not plug the equipment. Since the transformer is provided on a plate inside the insulation, the distance between the plates and the voltage may easily be varied. In this way, blocking of the coalescing device may be avoided at the same time as a high field between the plates is maintained.

In contrast to the solution described in WO 2007/135506, where at least two plates were connected to the same power supply means, the invention according to the present invention has only one plate connected to the high-voltage power supply means. The advantage of the present configuration is that no high-voltage connectors are needed. High-voltage connectors in fluids consisting of crude oil and water is a well known challenge that is both expensive and sets strong limits on the flexibility of electrode arrangements. Another large advantage of the present invention compared to WO 2007/135506, is the flexibility of on-site adjustments of the electrode arrangement. In WO 2007/135506, much of the assembly has to be performed in controlled environments on-shore, while the present invention, due to the fact that each plate is totally insulated together with its high-voltage power supply means, can be assembled on-site.

As with other fully insulated electrodes, the present invention can tolerate being fully submerged in water or standing in gas phase. There will also be less electrical stresses on the insulation, since an earthed connector is not provided directly on the insulation.

Further advantages as well as advantageous features of the inventive coalescing device will appear from the following description and the dependent claims.

BRIEF DESCRIPTION OF DRAWINGS

With reference to the appended drawings, a specific description of preferred embodiments of the invention cited as examples follows below. In the drawings.

DETAILED DESCRIPTION

The present invention will be described with reference to the drawings. The same reference numerals are used for the same of similar features in all the drawings and throughout the description.

Figure 1:
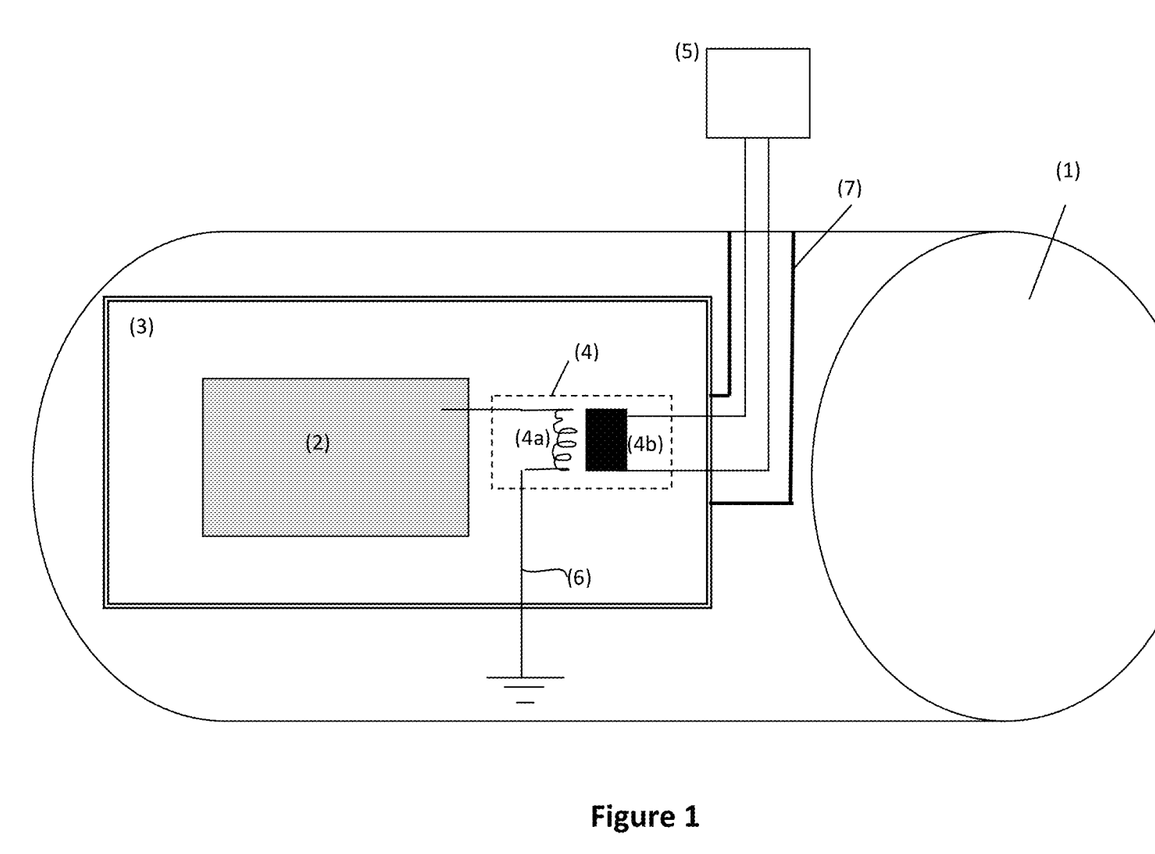
FIG. 1 is a schematic side view of an electrostatic coalescer/treater according to a first embodiment of the invention. Flow is from left to right.

A very schematic illustration of an electrostatic coalescing device according to an embodiment of the invention is shown in FIG. 1. The electrostatic coalescing device is located inside a vessel or pipe 1. The vessel/pipe is provided with an inlet for receiving an emulsion to be treated by the coalescing device. The flow direction of the flow to be treated is in FIG. 1 from left to right. Inside the vessel/pipe there is a metal (e.g. steel, aluminum, copper etc.) electrode plate 2 connected to a transformer 4. The metal electrode plate 2 and the transformer are fully enclosed by insulation 3. The transformer is energized from an external alternating low voltage source 5. The low voltage source is arranged on the outside of the pipe or vessel 1 in FIG. 1. The transformer has a first end of a high voltage winding 4a connected electrically to the metal plate 2. The second end of the high voltage winding 4a of the transformer is connected to a ground potential 6 of said vessel or pipe 1. The connection to ground 6 from the transformer is carried out of the insulation 3 in a fluid tight manner to ensure that no leakage shall occur into the enclosed metal plate and transformer. The low voltage winding 4b of the transformer is connected to an external power supply. This connection is also carried out of the insulation 3 in a fluid tight manner protected by a steel tubing 7. The protective steel tubing 7 is mechanically connected to the insulation 3 and to the pipe or vessel 1 wall, to provide a fluid tight guide for the connection from the low voltage side of the transformer to the external power source 5. The fluid tight mechanical connection to the insulation can be achieved either by sealings (e.g. o-rings) or by casting a connector into the insulation which is then welded to the protective tubing. On the vessel or pipe a standard penetrator design in a nozzle can be used or the protective tubing can be welded directly to the vessel or pipe wall.

In the embodiment in FIG. 1 the plate and the transformer are molded in an insulating material forming an integrated module. Only a low voltage connection to the transformer from the outside is needed. Since a high voltage connector system is not used in the embodiment in FIG. 1, it is possible to vary the distance between the plates providing a highly flexible solution. The distance between the plates may be individually controlled, making it possible to minimize the risk of fouling and clogging of the device. This is important in installation on fields with crude oils containing large amounts of naphthenic acids, hard scale or soft scale.

Figure 2:
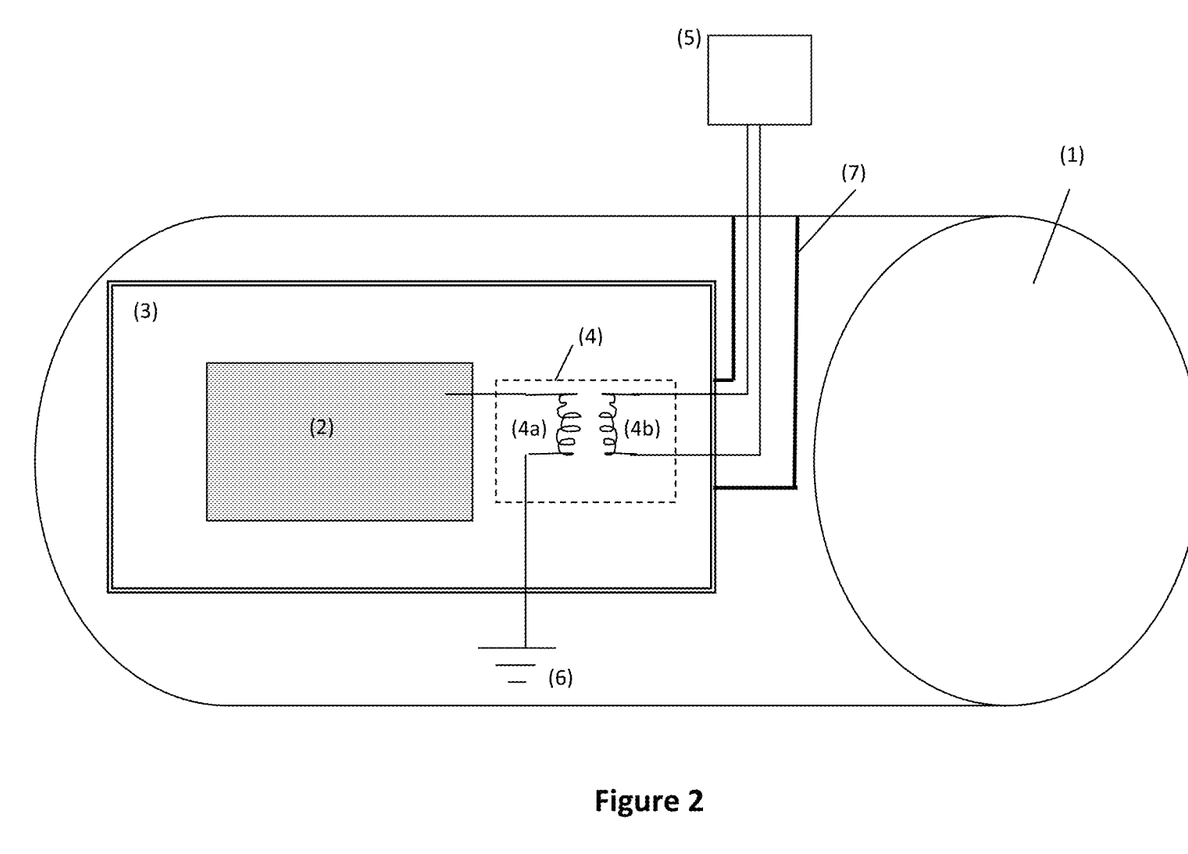
FIG. 2 is a schematic side view of an electrostatic coalescer according to a second embodiment of the invention. Flow is from left to right.

FIG. 2 provides a further embodiment of an electrostatic treater. The flow to be treated by the coalescing device is from left to right. The embodiment in FIG. 2 provides a solution for energizing the plates through a plus/minus connection from the plates to an external power supply. In this embodiment both the ends/terminals of the low voltage winding of the transformer are connected to the external power supply 5. The connection to the external power supply is also provided inside the protective steel tubing 7, as in the embodiment in FIG. 1. As in the embodiment in FIG. 1, the second end of the high voltage winding 4a of the transformer is connected to a ground potential 6 of said vessel or pipe 1.

Figure 3:
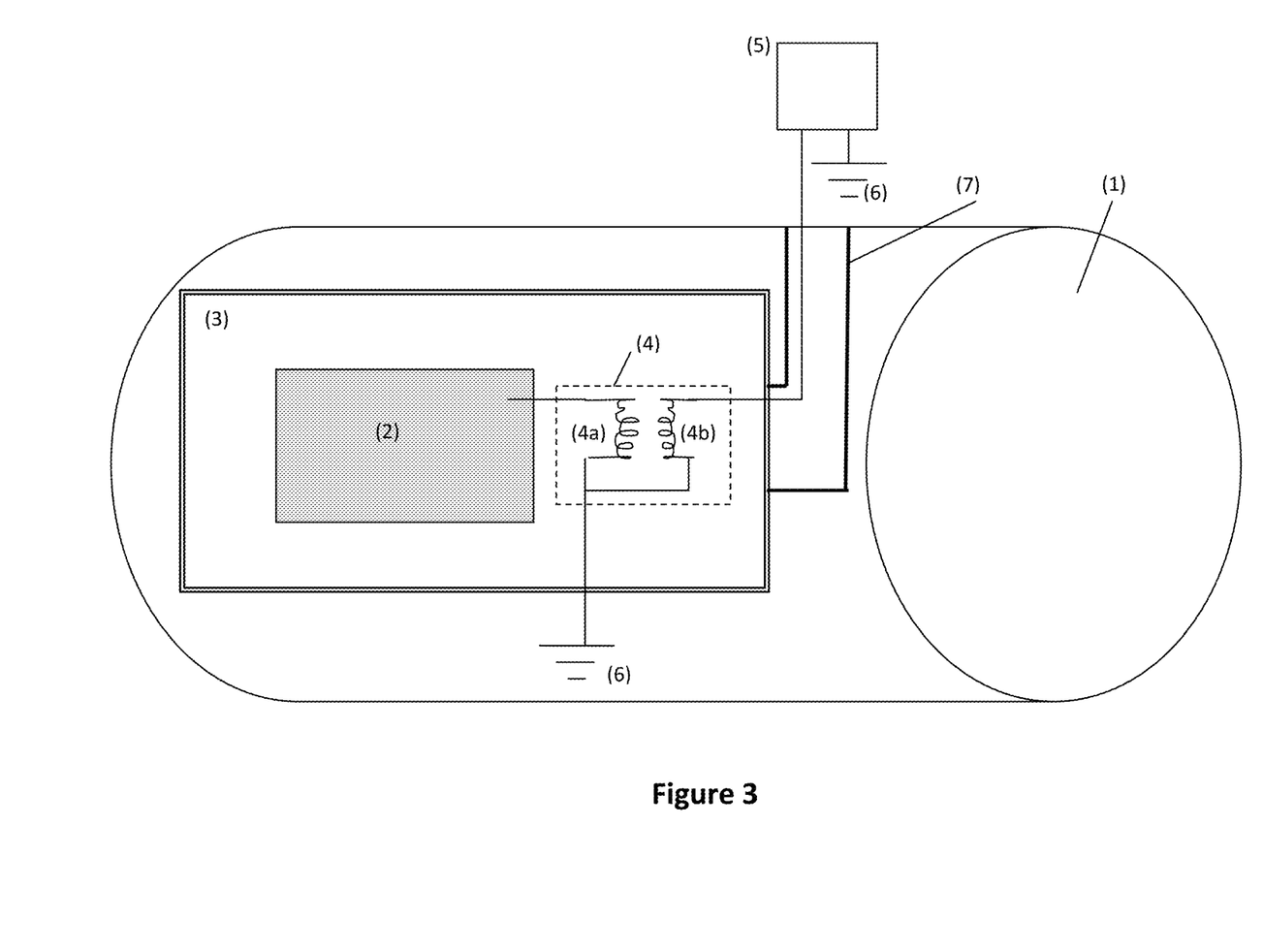
FIG. 3 is a schematic side view of an electrostatic coalescer according to a third embodiment of the invention. Flow is from right to left.

FIG. 3 shows very schematically an alternative embodiment of an electrostatic treater. The flow to be treated by the coalescing device is from left to right. The embodiment in FIG. 3 provides an alternative solution for energizing the plates through a plus/minus connection from the plates to an external power supply. In FIG. 3, a second end of a low voltage winding 4b of the transformer is within the insulation connected to a first terminal/end of the high voltage winding 4a. The second terminal/end of the low voltage winding 4b and the second terminal/end of the high voltage winding 4a are further connected to a ground potential 6 of said vessel or pipe. The first terminal/end of the low voltage winding 4b is carried out of the insulation through the protecting steel tubing 7 and electrically connected to the external power supply 5. The external power supply 5 is connected to a ground potential 6. Compared to the embodiment in FIG. 2, the embodiment in FIG. 3 only uses two wirings through the isolation material surrounding the metal plate and transformer. This provides termination of less wirings, reducing the installation time. In an offshore environment this may in particular be important. One connection may take 5 minutes, and an installation of a coalescing device may require connection of 300-400 plates. Also, a retrofit of the separator will take considerably less time, considerably reducing the production loss for the oil companies during such retrofit.

Figure 4:
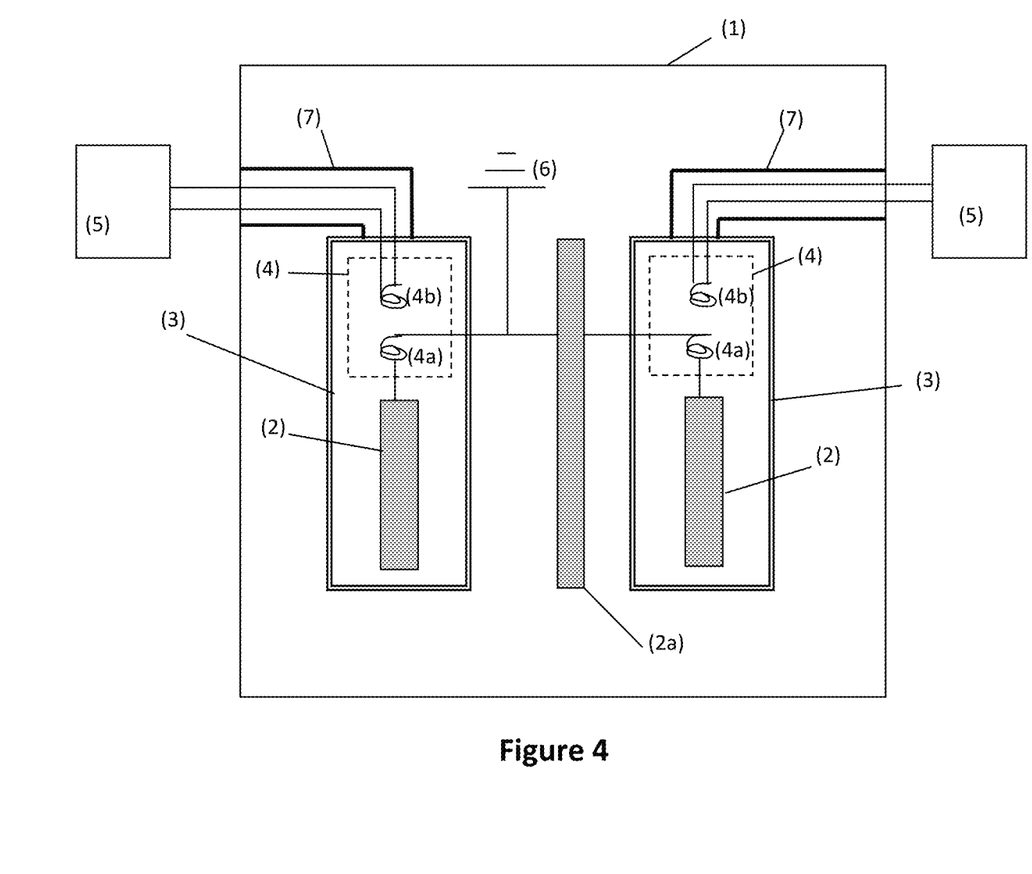
FIG. 4 is a schematic side view of an electrostatic coalescer according to an embodiment of the invention. Flow is from bottom to top. The external low-voltage source is moved to the side in order to make the sketch more understandable.

FIG. 4 shows very schematically an alternative embodiment of an electrostatic coalescer. The electrostatic coalescer is illustrated in a top view. The flow of emulsion to be treated is from the bottom to the top in FIG. 4. The electrostatic coalescer is in FIG. 4 provided with a pair of insulated electrodes arranged at a distance from each other side-by-side so as to form a flow passage between them. Between any adjacent pair of such insulated plates there is a grounded conductive plate 2a. The conductive plate is grounded to the ground potential 6 of said vessel or pipe. Here the high voltage electric field is established by at least one plate according to FIG. 1 or 2, separated by a conductive electrode connected to ground. In this configuration a high voltage field is set up between the insulated plate and the conductive grounded plate. Since all high-voltage plates are separated by a grounded plate on the same ground potential to which the second end of the high voltage winding is connected, phase differences in the electric field from different plates will not interfere with each other. Such interference may lead to cancelling of the electric field in the space between the high-voltage plates, which should be avoided.

FIG. 4 provides a solution for providing an electrical field between the plates in the coalescing device, using an active insulated electrode and a passive grounded electrode. The passive electrode may be insulated or may not be insulated. An electrical field is created, generated by the transformer, between the active and the passive electrode. The solution in FIG. 4 does neither require synchronization of the active electrodes, since the passive electrode provides a grounded separation potential between the active electrodes. However, the solution in FIG. 4 uses a higher peak voltage than a solution using a field between two active plus/minus electrodes (symmetrical system). In FIG. 4 the passive electrode is grounded. To achieve the same field as in a symmetrical system, the external values on the voltage on the active electrode should be twice as high as compared to ground. In an active/passive system, the insulation on the active electrode will be exposed to twice the field when the plates are submerged into water (very conductive). Due to possible degradation/discharge of the insulation, it is desired to have a field as low as possible in the insulation.

Figure 5:
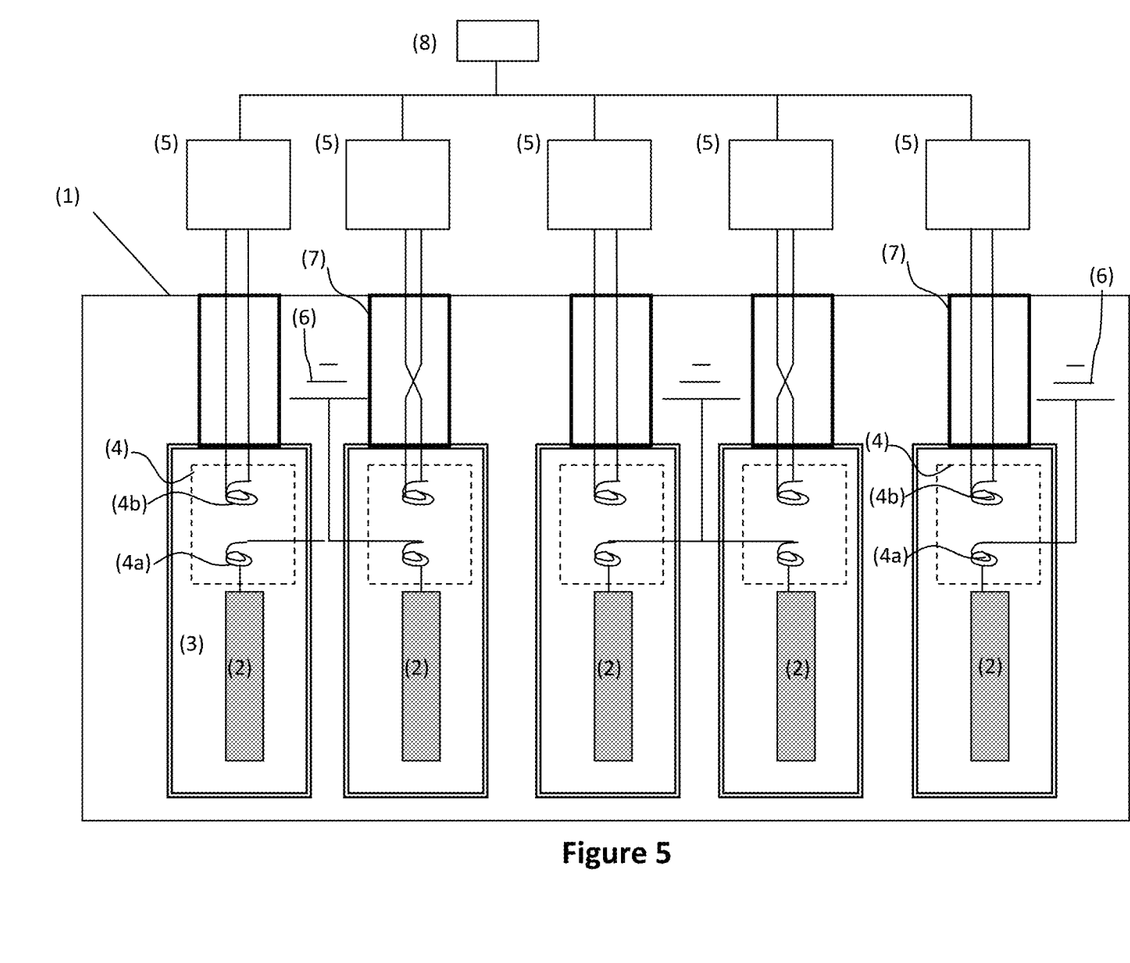
FIG. 5 is a schematic side view of an electrostatic coalescer according to an embodiment of the invention. Top view. Flow is from bottom to top. The external low-voltage sources are moved to the top in order to make the sketch more understandable.

FIG. 5 shows very schematically an alternative embodiment of an electrode configuration of an electrostatic coalescing device in the form of a number of insulated metal electrode plates 2, each plate having a dedicated integrated transformer 4. The flow of emulsion to be treated is from the bottom to the top. Each plate with transformer is also provided with an external dedicated power supply 5. The external power supply is a voltage source. The electrical connective wiring between the low voltage side of the transformer 4b and the dedicated power supply 5 is electrically twisted for every other plate. Both ends/terminals of the low voltage winding of the transformer are connected to the external power supply 5 as in the embodiment shown in FIG. 2. The connection to the external power supply is provided inside a protective steel tubing 7 and the wiring is twisted inside said tubing. All the external power supplies/voltage sources 5 are connected to a common timer 8 for synchronization. The timer 8 provides all insulating plates with an alternating voltage having the same frequency and with a common time reference, wherein adjacent plates are energized with the opposite polarity.

As in the previous embodiment described in FIG. 2, the metal electrode plate 2 and the transformer are fully enclosed by insulation 3. The first end of a high voltage winding 4a of the transformer is connected electrically to the metal plate 2. The electrodes are connected in pairs, as the second end of the high voltage winding 4a of the transformer is connected to a high voltage winding 4a of an adjacent plate 2, and further connected to a ground potential 6 of the pipe or vessel.

The embodiment in FIG. 5 provides a +/− system, where all the electrodes are active. The electrodes used are according to the embodiment shown in FIG. 2. In such a system all the electrodes are supplied with a voltage having the same frequency, and where adjacent electrodes are provided with a potential of the opposite polarity. In FIG. 5 the opposite polarity is provided to the insulated plates themselves. To avoid beat frequencies, all the dedicated power supplies start synchronously and have the same frequencies. The power supplies provide a voltage symmetrically about ground, since one end of the high voltage transformer is grounded. Every other plate should be out of phase by 180°, requiring that the wirings of every other power supply are twisted, as illustrated in FIG. 5. Although not shown in FIG. 5, it is also possible to use the electrodes according to the embodiment shown in FIG. 1 or FIG. 3. In the embodiments in FIG. 1 and FIG. 3, only a first end of the low voltage winding 4b of the transformer is taken out of the insulation, through the protective steel tubing 7 and to the external power supply 5. When using the electrodes from the embodiments in FIGS. 1 and 3, the first end of the low voltage winding 4b is twisted, meaning that the first ends of the low voltage windings 4b of adjacent electrodes are connected to terminals of the dedicated external power supplies 5 having opposite polarity.

Figure 6:
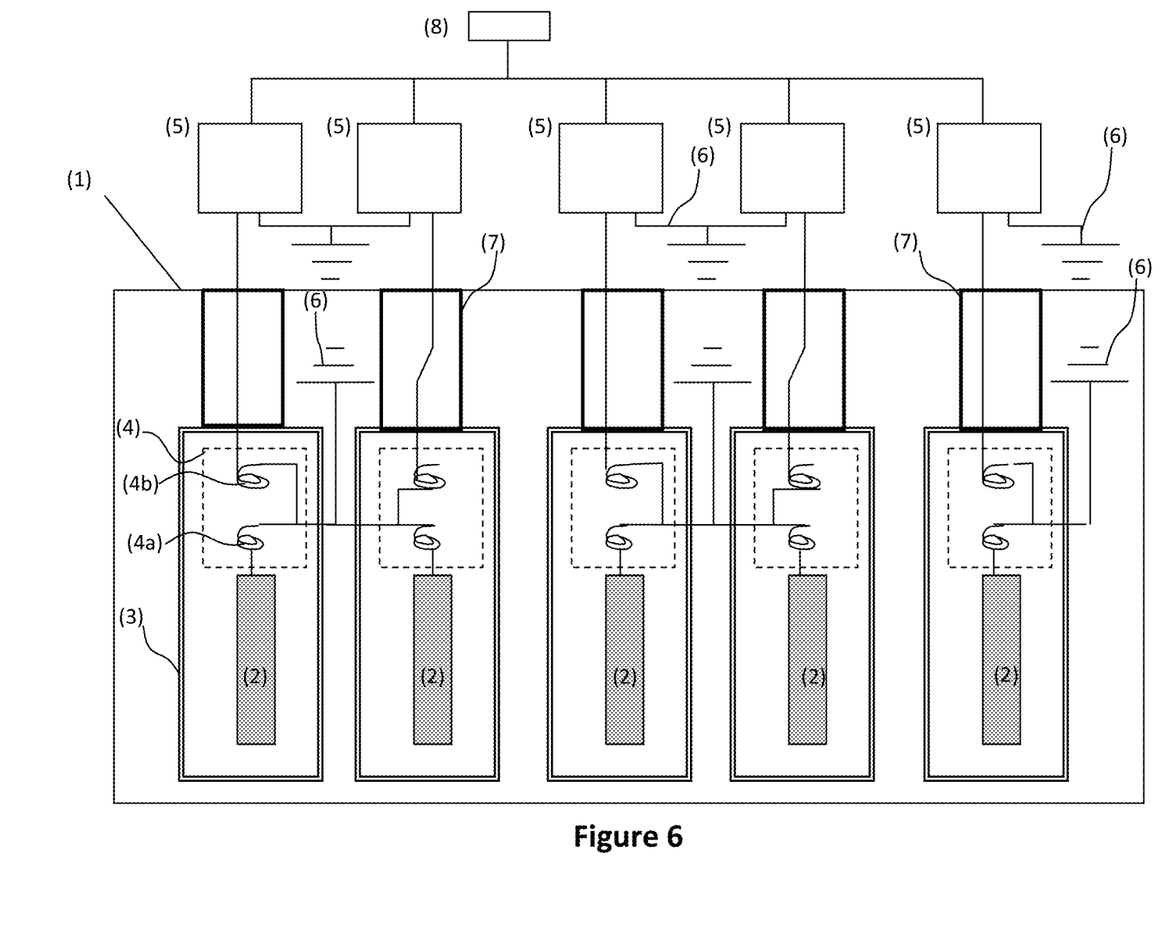
FIG. 6 is a schematic side view of an electrostatic coalescer according to an embodiment of the invention. Top view. Flow is from bottom to top. The external low-voltage sources are moved to the top in order to make the sketch more understandable.

FIG. 6 shows schematically a further alternative embodiment of an electrode configuration of an electrostatic coalescing device having a number of insulated metal electrode plates 2 (as shown in FIG. 3), each plate having a dedicated integrated transformer 4. The flow of emulsion to be treated is from the bottom to the top. Each plate with transformer is also provided with an external dedicated power supply 5. The external power supply is an alternating voltage source. In FIG. 6 a second end of a low voltage winding 4b of the transformer is within the insulation connected to a second terminal/end of the high voltage winding 4a. The second terminal/end of the low voltage winding 4b and the second terminal/end of the high voltage winding 4a are further connected to a ground potential 6 of said vessel or pipe. The electrodes are connected in pairs, as the second terminal/end of the low voltage winding 4b and the second end of the high voltage winding 4a of the transformer is further connected to a corresponding high voltage winding 4a and low voltage winding 4b of an adjacent plate 2, and further connected to a ground potential 6 of the pipe or vessel.

The first terminal/end of the low voltage winding 4b is carried out of the insulation through the protecting steel tubing 7 and electrically connected to the external power supply 5. The pairs of electrodes as defined above also have an opposite channel of their corresponding external power supplies 5 connected to each other, and further connected to the ground potential 6 of said pipe or vessel. The ground potential of said transformer terminals and the power supplies are the same. As in the embodiment in FIG. 5 all the external power supplies are connected to the same timer 8 for synchronization.

As in FIG. 5, the embodiment in FIG. 6 provides a +/− system, where all the electrodes are active. However, the electrodes used are according to FIG. 3. Also, in the embodiment in FIG. 6, to avoid beat frequencies, all the dedicated power supplies start synchronously and have the same frequencies. However, one pole of each power supply is grounded. The other pole is connected to the low voltage terminal 4b of the cast-in transformer. In order to achieve every other plate having a +/− potential, adjacent power supplies are connected to ground/earth through the opposite poles.

The embodiments shown in FIGS. 4, 5 and 6 provide rows of two or more sets/modules with parallel planar electrodes arranged in parallel with the flow direction of the emulsion providing a flow passage between them.

As with other fully insulated electrodes, the present invention can tolerate being fully submerged in water or standing in gas phase. As an earthed connector is not arranged directly in contact with the isolation, less electrical stresses are provided to the isolation.

Although the invention is applicable to any type of oil-treatment line, it is particularly advantageous in offshore and onshore applications involving a coalescing device arranged for promoting or effectuating separation of water from oil or water droplet enlargement.

The invention is of course not in any way restricted to the embodiments described above. On the contrary, many possibilities to modifications thereof will be apparent to a person with ordinary skill in the art without departing from the basic idea of the invention such as defined in the appended claims.

What is claimed is:

1. An electrostatic coalescing device comprising:
a vessel or a pipe through which a flow to be treated flows, and
at least one metal electrode plate and transformer arranged inside said pipe/vessel, wherein said metal electrode plate and the transformer are fully enclosed by insulation and form a module, wherein said transformer is electrically connected to an external alternating low voltage source/power supply located outside the vessel/pipe, said transformer having a first end of a high voltage winding connected electrically to the metal plate within the insulation, wherein the module is configured to be fully immersed within the flow to be treated.

2. An electrostatic coalescing device according to claim 1, wherein a second end of the high voltage winding is carried out of the insulation and electrically connected to a ground potential of the vessel/pipe.

3. An electrostatic coalescing device according to claim 1, wherein the external power supply/voltage source is electrically connected to a low voltage winding of the transformer.

4. An electrostatic coalescing device according to claim 1, wherein an electrical connection from the external power supply/voltage source to a low voltage winding of the transformer is carried through the vessel or pipe in a protecting steel tubing, wherein said steel tubing is mechanically connected to the insulation and is carried into/through the insulation.

5. An electrostatic coalescing device according to claim 4, wherein both ends of the low voltage winding are carried through the insulation and out of said vessel/pipe in the protecting steel tubing and connected to the external power supply.

6. An electrostatic coalescing device according to claim 4, wherein a second end of the low voltage winding of the transformer is, within the insulation, connected to the second end of the high voltage winding connected to the ground potential, and that a first end of the low voltage winding is carried out of the insulation in the protecting steel tubing and electrically connected to a first terminal of the external power supply, wherein a second terminal of the external power supply is connected to the ground potential.

7. An electrostatic coalescing device according to claim 1, comprising a plurality of modules each module having an electrode plate and a dedicated integrated transformer, the plate and transformer being fully enclosed by insulation,
wherein each module is configured to be fully immersed within the flow to be treated,
wherein a grounded conductive plate is arranged between pairs of insulated modules.

8. An electrostatic coalescing device according to claim 1, comprising a number of adjacent insulated metal electrode plates, each of said insulated plates having a dedicated integrated transformer and a dedicated external power supply, wherein each transformer has a low voltage winding having two ends configured to be energized by the dedicated power supply;
wherein the ends of the low voltage winding for every other plate are electrically twisted providing adjacent plates to be energized with an opposite polarity.

9. An electrostatic coalescing device according to claim 6, comprising a number of adjacent insulated metal electrode plates, each of said insulated plates having a dedicated integrated transformer and a dedicated external power supply, wherein the first end of the low voltage winding of every other plate is electrically twisted providing adjacent plates to be energized with an opposite polarity.

10. An electrostatic coalescing device according to claim 1, comprising:
a plurality of modules each module having an electrode plate and a dedicated integrated transformer, the plate and transformer being fully enclosed by insulation,
wherein each module is configured to be fully immersed within the flow to be treated,
wherein each transformer is electrically connected to an external alternating power supply and every other power supply has the opposite terminal connected to a ground potential.

11. An electrostatic coalescing device according to claim 8, wherein the external power supplies/voltage sources are connected to a common timer for synchronization, providing said insulated plates with an alternating voltage with a same frequency and a common time reference.

12. An electrostatic coalescing device according to claim 1, wherein the external power supply/voltage source is electrically connected to a low voltage winding of the transformer.

13. An electrostatic coalescing device according to claim 2, comprising a plurality of adjacent insulated metal electrode plates, each of said insulated plates having a dedicated integrated transformer, wherein a grounded conductive plate is arranged between any adjacent pair of insulated plates.

14. An electrostatic coalescing device according to claim 3, comprising a plurality of modules each module having an electrode plate and a dedicated integrated transformer, the plate and transformer being fully enclosed by insulation,
wherein each module is configured to be fully immersed within the flow to be treated,
wherein a grounded conductive plate is arranged between pairs of insulated modules.

15. An electrostatic coalescing device according to claim 2, comprising a number of adjacent insulated metal electrode plates, each of said insulated plates having a dedicated integrated transformer and a dedicated external power supply, wherein the ends of the low voltage winding of every other plate are electrically twisted providing adjacent plates to be energized with an opposite polarity.

16. An electrostatic coalescing device according to claim 6, comprising:
a plurality of modules each having an electrode plate and a dedicated integrated transformer,
wherein the electrode plate and the transformer are fully enclosed by insulation, wherein each transformer is electrically connected to an external alternating power supply and every other power supply has the opposite terminal connected to a ground potential.

17. An electrostatic coalescing device according to claim 9, wherein the external power supplies/voltage sources are connected to a common timer for synchronization, providing said insulated plates with an alternating voltage with a same frequency and a common time reference.

18. An electrostatic coalescing device for use with a mixture of fluids, the device comprising:
a vessel or a pipe,
an alternating power supply located outside the vessel/pipe,
a module arranged inside said pipe/vessel and having:
an electrode plate,
a transformer with a high voltage winding and a low voltage winding, and
insulation fully enclosing the electrode plate and the transformer,
wherein the high voltage winding of the transformer has a first end connected electrically to the electrode plate within the insulation,
wherein an electrical connection extending from the low voltage winding of the transformer to the power supply is disposed in a tubing extending through the vessel/pipe, and
wherein the tubing is mechanically connected to the insulation and extends into the insulation.

19. An electrostatic coalescing device for use with a mixture of fluids, the device comprising:
a vessel or a pipe,
a plurality of alternating power supplies located outside the vessel/pipe,
a plurality of adjacent modules arranged inside said pipe/vessel, each module having:
an electrode plate,
a transformer with a high voltage winding and a low voltage winding, and
insulation fully enclosing the electrode plate and the transformer,
wherein the high voltage winding of the transformer has a first end connected electrically to the electrode plate within the insulation;
wherein the low voltage winding of each transformer has two ends configured to be energized by a dedicated power supply from among the plurality of alternating power supplies,
wherein the two ends of the low voltage winding of every other module are electrically twisted, configuring adjacent modules to be energized with an opposite polarity.

* * * * *